United States Patent
Wang et al.

(10) Patent No.: US 9,547,655 B1
(45) Date of Patent: Jan. 17, 2017

(54) FILESYSTEM INDEPENDENT SNAPSHOT DRIVER

(71) Applicant: CA, Inc., Islandia, NY (US)

(72) Inventors: Zhiye Wang, Beijing (CN); Chuanqi Sun, Beijing (CN)

(73) Assignee: CA, Inc., Islandia, NY (US)

( * ) Notice: Subject to any disclaimer, the term of this patent is extended or adjusted under 35 U.S.C. 154(b) by 582 days.

(21) Appl. No.: 13/939,241

(22) Filed: Jul. 11, 2013

(51) Int. Cl.
*G06F 17/30* (2006.01)

(52) U.S. Cl.
CPC .............................. *G06F 17/30088* (2013.01)

(58) Field of Classification Search
None
See application file for complete search history.

(56) References Cited

U.S. PATENT DOCUMENTS

| | | | | |
|---|---|---|---|---|
| 6,434,682 | B1 * | 8/2002 | Ashton | G06F 3/0605 707/E17.01 |
| 6,473,775 | B1 * | 10/2002 | Kusters | G06F 3/0608 707/649 |
| 2007/0198605 | A1 * | 8/2007 | Saika | G06F 17/30088 |

OTHER PUBLICATIONS

Yerrick, Block device 2006, pineeight.com, https://pineight.com/ds/block/.*
The Open Group Base Specifications 2013, IEEE and The Open Group, Iss. 7, http://pubs.opengroup.org/onlinepubs/9699919799/basedefs/V1_chap03.html.*
Howe, agent Apr. 9, 1995, The Free On-Line Dictionary of Computing, http://foldoc.org/agent.*
Sheer, Paul; Linux Rute User's Tutorial and Exposition (2002); Chapter 18: Unix Devices; http://www.physics.udel.edu/~bnikolic/teaching/phys660/RUTE/rute/index.html.
Dahyabhi, Nalin; MANPAGE for "makedev" (2001); http://linuxcommand.org/man_pages/MAKEDEV8.html.
Pate, Steve D.; Unix Filesystems Evolution, Design, and Implementation; Wiley Publishing, Inc. (2003), p. 90.

* cited by examiner

*Primary Examiner* — Jason Liao
(74) *Attorney, Agent, or Firm* — Stevens & Showalter, LLP

(57) ABSTRACT

Performing a snapshot backup includes initiating, by a snapshot driver, a snapshot of at least a portion of a filesystem; and receiving, by the snapshot driver, a filesystem bitmap from a backup agent. Subsequently, the snapshot driver performs copy-on-write operations based on the filesystem bitmap.

27 Claims, 7 Drawing Sheets

FILESYSTEM INDEPENDENT SNAPSHOT DRIVER

BACKGROUND

The present disclosure relates to data backups, and more specifically, to snapshot backups.

In computer systems, a snapshot is the state of a system at a particular point in time. A full backup of a large data set may take a long time to complete. On multi-tasking or multi-user systems, there may be writes to that data while it is being backed up. This prevents the backup from being atomic and introduces a version skew that may result in data corruption. For example, if a user moves a file into a directory that has already been backed up, then that file would be completely missing on the backup media, since the backup operation had already taken place before the addition of the file. Version skew may also cause corruption with files which change their size or contents underfoot while being read.

One approach to safely backing up live data is to temporarily disable write access to data during the backup, either by stopping the accessing applications or by using a locking API provided by the operating system to enforce exclusive read access. This may be tolerable for low-availability systems such as on desktop computers and small workgroup servers, on which regular downtime is acceptable. High-availability 24/7 systems, however, may not tolerate such service stoppages. To avoid downtime, high-availability systems may instead perform the backup on a snapshot—a read-only copy of the data set frozen at a point in time—and allow applications to continue writing to their data. The time and I/O needed to create the snapshot does not increase with the size of the data set, whereas the same for a direct backup is proportional to the size of the data set.

BRIEF SUMMARY

According to one aspect of the present disclosure, a system includes a processor and a memory coupled to the processor, the memory configured to store program code executable by the processor. The program code, when executed by the processor is configured to: initiate, by a snapshot driver, a snapshot of at least a portion of a filesystem; receive by the snapshot driver a filesystem bitmap from a backup agent; and perform copy-on-write operations, by the snapshot driver, based on the filesystem bitmap.

According to another aspect of the present disclosure, a method for performing a snapshot backup includes initiating, by a snapshot driver, a snapshot of at least a portion of a filesystem; and receiving, by the snapshot driver, a filesystem bitmap from a backup agent. Subsequently, the snapshot driver performs copy-on-write operations based on the filesystem bitmap.

According to another aspect of the present disclosure, a computer program product includes a computer readable storage medium having computer readable program code embodied therewith. The computer readable program code includes computer readable program code configured to: initiate, by a snapshot driver, a snapshot of at least a portion of a filesystem; receive by the snapshot driver a filesystem bitmap from a backup agent; and perform copy-on-write operations, by the snapshot driver, based on the filesystem bitmap.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
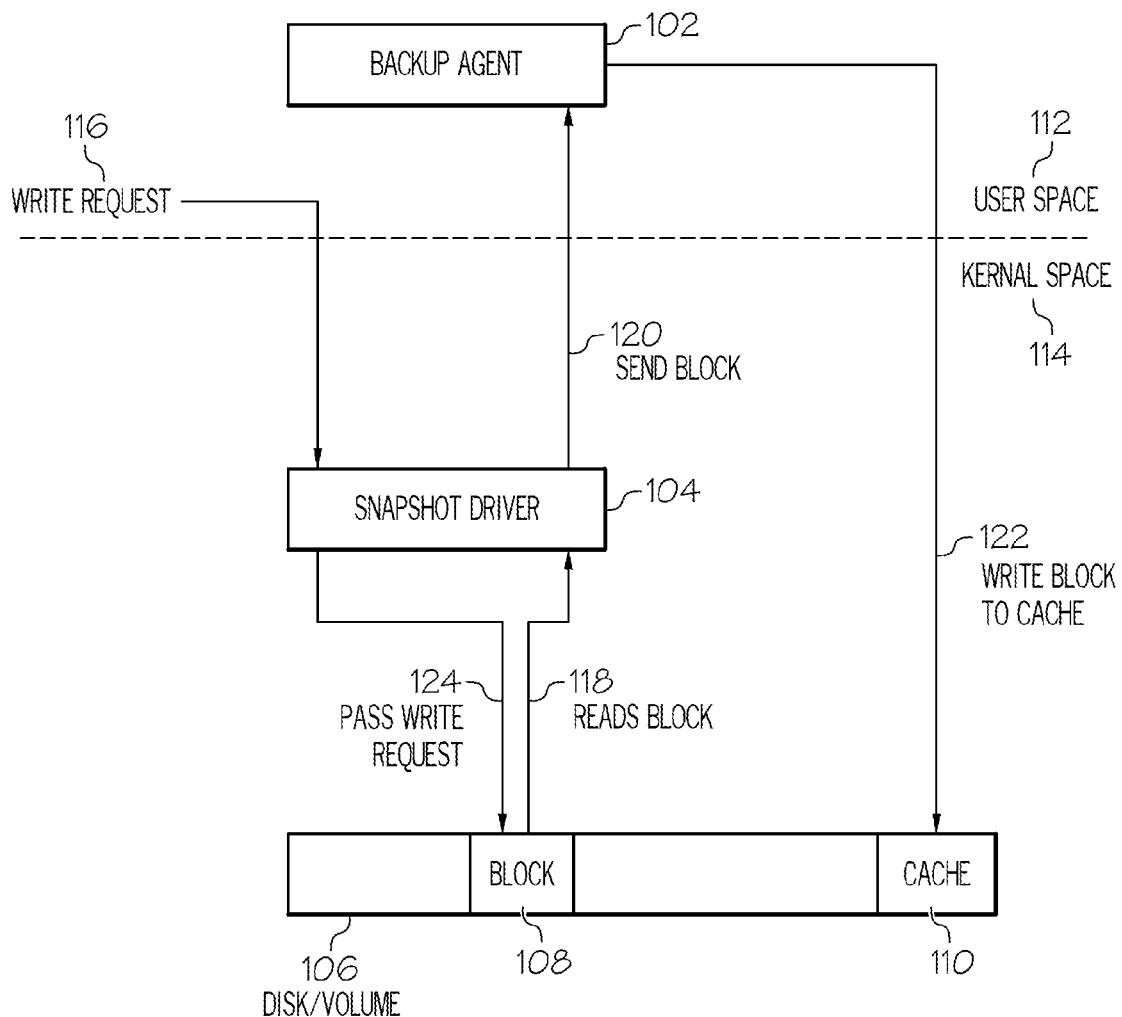
FIG. 1 depicts operation of a typical copy-on-write (CoW) based snapshot driver.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including MAINFRAME Assembler, an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 depicts operation of a typical copy-on-write (CoW) based snapshot driver. There is a backup agent 102 and a snapshot driver 104 that work in conjunction with one another to backup a disk or volume 106 while other user applications continue to be able to write to the disk or volume 106.

For convenience in the following description, the term "disk" is used to refer to data that is stored in a filesystem. One of ordinary skill will readily recognize that this "disk" may be a virtualized device or a physical device. Furthermore, the "disk" may be a volume that occupies part of a storage device, occupies all of a storage device, or occupies multiple storage devices. Typically, the actual data stored on the disk will be organized according to a filesystem which is implemented within an operating system. User applications executing within that operating system access data on the disk according to the filesystem's organization.

A "block" is a uniformly sized unit of storage for a filesystem (e.g., a block can be 4 KB in size). Thus, a filesystem that is 400 KB in size would be comprised of 100 blocks. The filesystem includes methods and data structures that an operating system uses to keep track of files on a disk. It allows the user to assign symbolic names to files and directories while maintaining a record of the specific blocks that contain the data within those files and directories. When a read or write request for data is received, the operating system determines the blocks of the filesystem that are needed to satisfy the request and then requests those blocks from the disk. At a disk device driver level, or possibly, at a disk hardware interface level, a block number is translated into a physical location and data stored at that physical location is retrieved from, or written to, the disk.

Returning to FIG. 1, a user may want to create a snapshot of the disk 106 which can then be backed up. The backup agent 102 is executed to perform a backup of various files stored on the disk 106. The backup agent 102 may also be backing up the entire disk 106. As part of this backup process, the snapshot driver 104 is executed to intercept write requests that may change data stored on the disk 106. As explained in more detail later, the backup agent 102 typically operates in user space 112 while the snapshot driver typically operates in kernel space 114.

A "write request" 116 will be generated by a user application that wants to write a block of data to the disk 106. For example, the block may be block 108 as shown in FIG. 1. The write request 116 is intercepted by the snapshot driver 104 which reads 118 the block 108 from the disk 106. The block 108 that is read is sent 120 by the snapshot driver 104 to the backup agent 102. The backup agent 102 then writes that block 108 to a cache 110. The snapshot driver 104 then passes 124 the write request to the disk 106 so that the block 108 will be updated with the data of the write request 116.

In this manner, any blocks that are changed after the snapshot was initiated are written to the cache 110 and any unchanged blocks are not. As the backup agent 102 proceeds with backing-up the disk 106 it will retrieve each block for the backup from either the cache 110 or its original location on the disk 106. Thus, a backup of the disk 106 can reflect the stored data in the state it was in when the snapshot was initiated and writing to the disk 106 can continue while the backup is being performed.

Modern filesystems may vary in a number of different ways but each typically includes a block or filesystem bitmap that indicates used blocks. For example, in the hypothetical filesystem described above, there were 100 blocks. Thus, a 100-bit bitmap could be used to indicate whether a particular block was in use or not by storing a 1

(e.g., used) or 0 (e.g., unused) at the $n^{th}$ bit of the bitmap to reflect the state of the $n^{th}$ block of the filesystem. The operating system or other applications could then easily refer to the bitmap to determine whether a block was free or not. If a write request is received by the snapshot driver 104 for a block that happens to be unused, or free, then it is not necessary to copy-on-write (CoW) that block as it was not in use at the time the snapshot was initiated. Thus, the snapshot driver 104 can pass that write request directly to the disk 106.

As an operating system is executing in a computer's memory the memory can be divided into two distinct regions namely—the kernel space and the user space. The kernel runs in the part of memory entitled to it. This part of memory cannot be accessed directly by the processes of the normal users, while the kernel can access all parts of the memory. To access some part of the kernel, the user processes use the predefined system calls i.e. open, read, write etc. Also, the C library functions like print call the system call write in turn. The system calls act as an interface between the user processes and the kernel processes. The access rights are placed on the kernel space in order to stop the users from potentially corrupting the kernel, unknowingly. So, when a system call occurs, a software interrupt is sent to the kernel. The CPU may hand over the control temporarily to the associated interrupt handler routine. The kernel process which was halted by the interrupt resumes after the interrupt handler routine finishes its job.

In terms of a snapshot driver and a backup agent, the backup agent typically operates in user-space and the snapshot driver typically operates in kernel space. Because logic to handle different filesystem types is beneficial when taking snapshots of a filesystem, including this logic in the snapshot driver is inefficient when there are many different possible types of filesystems available. The snapshot driver would include separate logic for handling each of the different types of filesystems that it may encounter. In accordance with the principles of this disclosure, logic for determining information about a filesystem is included with the backup agent. Thus, as the capability to handle a new type of filesystem is developed it can be included in the application (e.g., the backup agent) that runs in user space. This allows the snapshot driver, which runs in kernel space, to be filesystem agnostic as it interfaces with the backup agent rather than an upper-layer filesystem.

Figure 2:
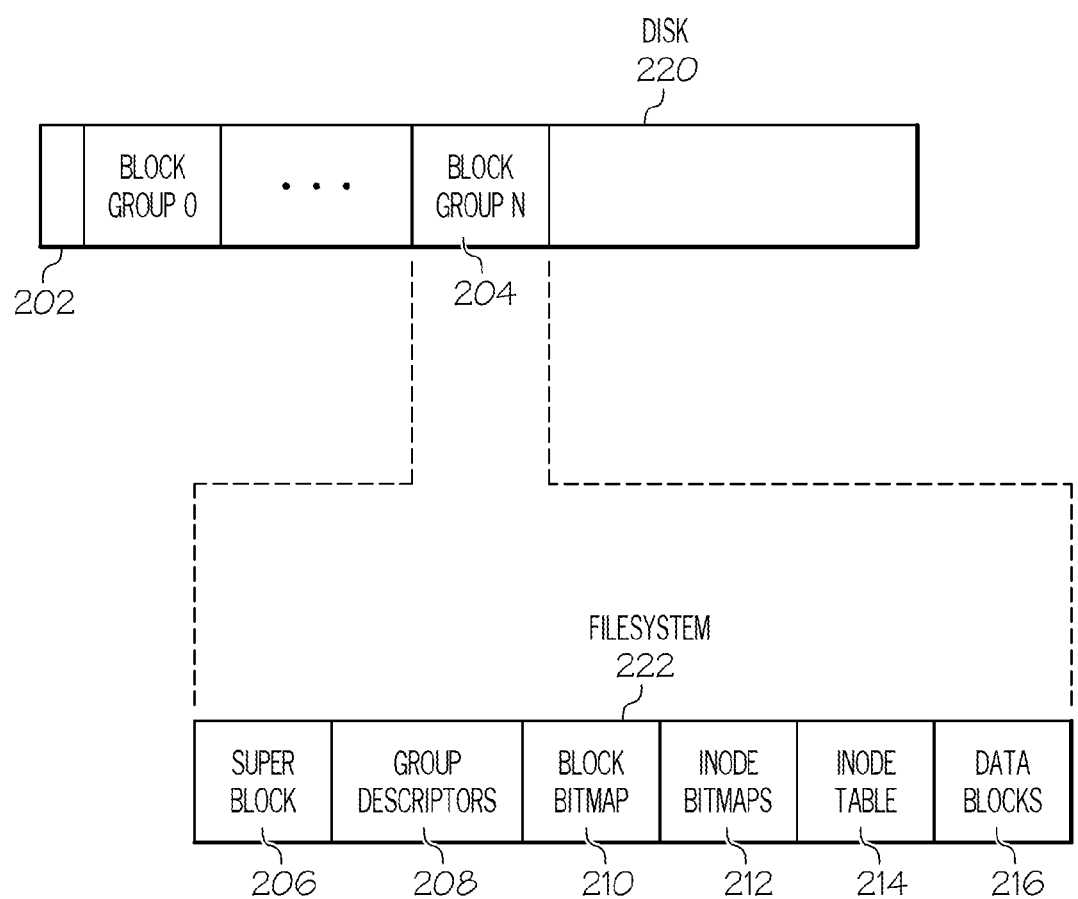
FIG. 2 depicts a logical arrangement of a disk and a filesystem that is stored on that disk.

FIG. 2 depicts a logical arrangement of a disk 220 and a filesystem 222 that is stored on that disk 220. Generally the disk 220 has an initial boot block 202 and then logical groups of blocks such as, for example, Block Group n 204. Block Group n 204 can be formatted according to a known filesystem structure so that data can be read from and written to the blocks that comprise Block Group n 204. The filesystem 222 depicted in FIG. 2 happens to be an EXT2 filesystem. It is provided merely by way of example to allow description of general filesystem attributes that may be involved with performing a filesystem snapshot and backup. One of ordinary skill will recognize that many other, alternative, filesystems may be used without departing from the scope of the present invention. For example, a non-exhaustive list of applicable filesystems can include FAT, FAT32, XFS, NTFS, NFS, UFS, EXT3, EXT4, VxFS, etc.

The filesystem 222 starts with a superblock 206 and contains information about the filesystem such as the number of reserved blocks, number of inodes, the filesystem size, the block size, a filesystem identifier, etc. The next section of blocks are group descriptors which include information about this group of blocks such as the block number of the block bitmap, the block number of the inode bitmap, the number of free blocks, the number of free inodes, etc. The block bitmap 210 has been described above in general and is useful for determining which blocks of the Block Group n 204 are free or used. The EXT2 filesystem happens to use inodes to reference files and directories and, therefore, an inode bitmap 212 is useful for tracking which inodes are in use and which are free. The inodes themselves occupy an inode table 214. The data blocks 216 are where each block of data is eventually stored. Physically, the data is, of course, stored on a disk but the block number associated with a particular data block is where the filesystem 222 considers that data to be stored.

The backup agent, therefore, can include logic for each of the different types of filesystems that it is designed for. Based on the filesystem type, the backup agent logic can determine the data structures and locations of filesystem information pertaining to that particular filesystem. Using the example of FIG. 2, the backup agent logic knows which bytes of the super block 206 reveal the filesystem block size, for example. The backup agent logic also knows where to look in the group descriptors 208 for the starting location of the block bitmap 210. Based on these pieces of information, the backup agent can, for example, retrieve the block bitmap 210 from the filesystem 222.

One of ordinary skill will recognize that there are various ways to determine the type of filesystem that was used when originally formatting Block Group n 204. Some typical techniques include comparing various byte locations of the super block to see if expected values or correlations between values can be identified. Also, many filesystems place "magic numbers" at predetermined byte locations within the superblock that identify the filesystem type. Thus, the backup agent can include a lookup table that matches a magic number to a filesystem type. Once the filesystem type is determined, then the backup agent can utilize logic specific to that filesystem type for extracting information (e.g., the block bitmap) about the filesystem. Many different techniques may be utilized to identify filesystem types without departing from the scope of the present invention.

Figure 3A:
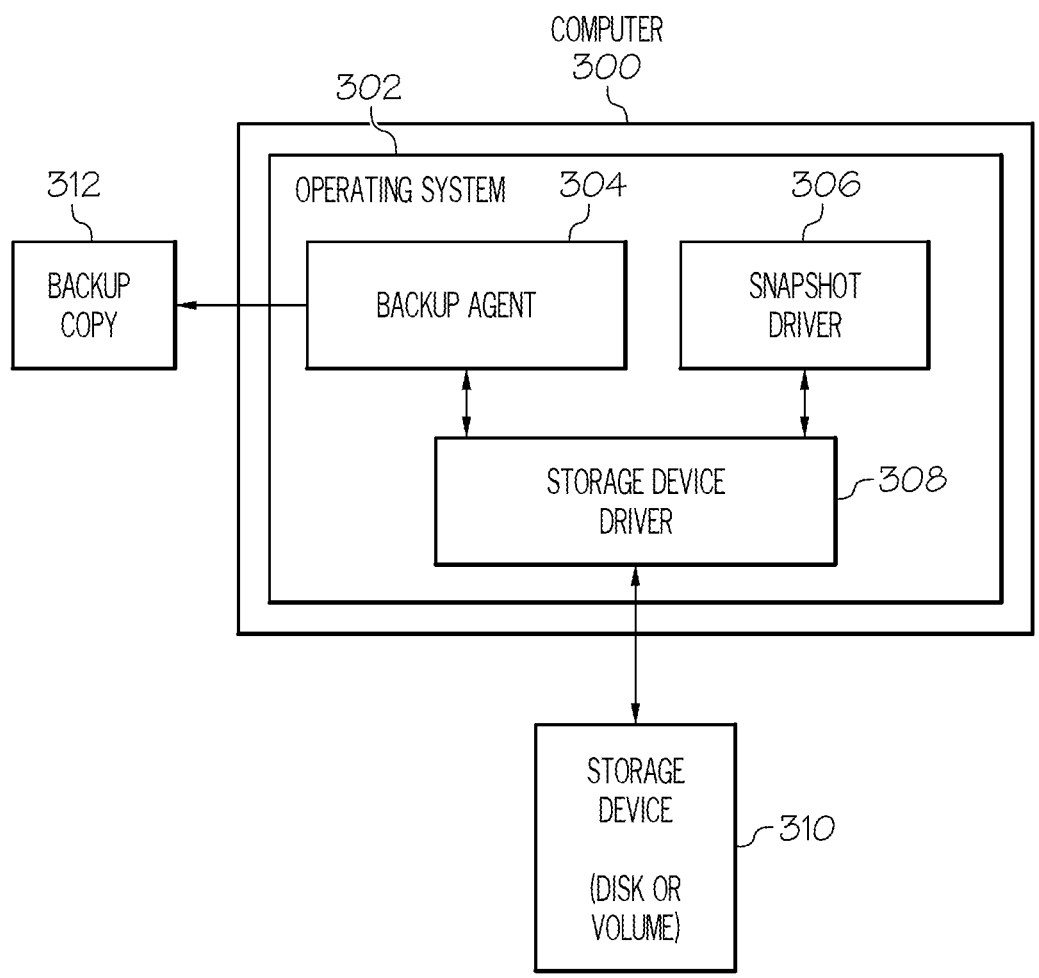
FIG. 3A depicts a system for performing a snapshot backup in accordance with the principles of the present disclosure.

FIG. 3A depicts a system for performing a snapshot backup in accordance with the principles of the present disclosure. A computer system 300 provides a platform on which an operating system 302 is executing. Various applications may be executing within the operating system 302 that read data from and write data to the storage device 310. The snapshot driver 306 may be used to intercept disk read and write requests so that the backup agent 312 is presented with a state of the disk 310 at a particular instance in time. The backup agent 312 can then utilize the presented state of the disk 310 to generate a backup copy 312, either locally or at a remote location. While the backup agent 304 and the snapshot driver can refer to block numbers, or block offsets, to specify which block of the filesystem is part of a read or write request, a device driver 308 for the disk 310 can be an intermediate application that translates block numbers into physical addresses that are utilized by the hardware of the disk 310.

Figure 3B:
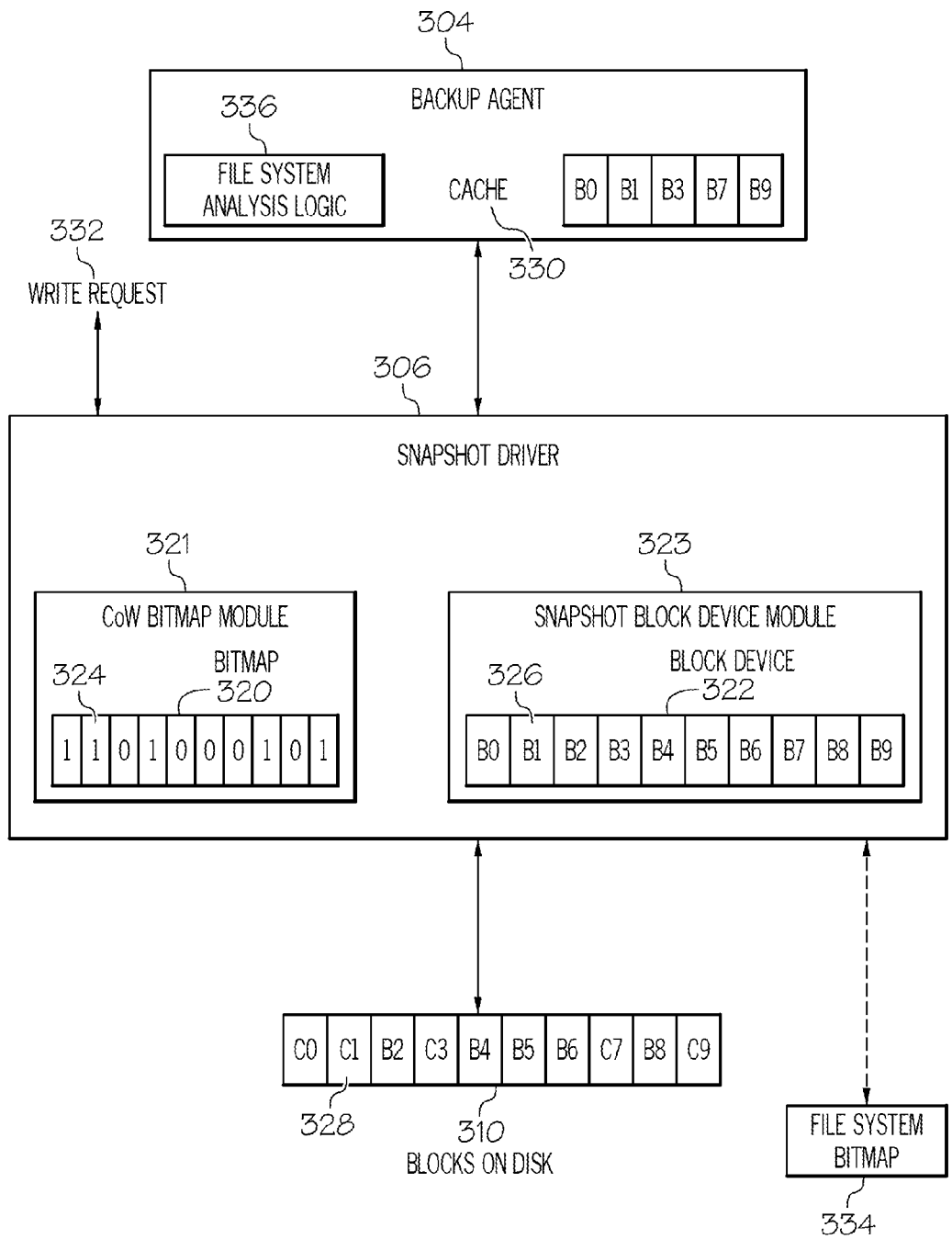
FIG. 3B depicts a functional block diagram of a backup agent and snapshot driver in accordance with the principles of the present disclosure.

FIG. 3B depicts a functional block diagram of a backup agent and snapshot driver in accordance with the principles of the present disclosure. The backup agent 304 includes a cache 330 that is used to store certain blocks of data as explained below. The snapshot driver 306 includes a CoW Bitmap module 321 that includes logic for maintaining a CoW Bitmap 320 and a snapshot block device module 323 that includes logic for interfacing with a snapshot block device 322. The disk 310 is logically shown in FIG. 3B as a number of sequential blocks wherein each block that is occupied stores data that can be referenced by a filesystem block number, or block offset.

One responsibility of the snapshot driver 306 is to perform a CoW for a write request 332 received from a higher-layer program or application. When there is no filesystem bitmap, the snapshot driver 306 does a CoW for every write request. However, when a filesystem bitmap is available, then the snapshot driver 306 performs CoW for used blocks only. Another responsibility of the snapshot driver 306 is to register a block device (e.g., snapshot block device 322). A user space application, such as for example the backup agent 304) can then use this block device 322 to access a current running snapshot.

The registered block device may be a logical model of a disk drive that is associated with the registered device name. An application will request particular block numbers of that device as a proxy for requesting block numbers from an actual disk device. The snapshot block device module 323 includes logic for receive the block request and for retrieving blocks from the actual disk device (or elsewhere). In particular, the blocks 326 of the logical snapshot block device 322 may have a one-to-one block-level correspondence to the disk 310. As explained more fully below, a user application (e.g., the backup agent 304) might desire access to Block #8 of the disk 310. Instead of formulating the request in such a way that the request references the disk 310, the request is addressed to, or references, the snapshot block device 322. The request still is for Block #8 but it is for Block #8 of the snapshot block device 322. The snapshot block device module 323 can then determine how to request the desired block from either the backup agent 304 or the disk 310.

One responsibility of the backup agent 304 is to cache the CoW blocks. Similar to FIG. 1, a block (e.g., BLOCK x) on the disk that is to be written to is first read from the disk and copied to a cache location. The backup agent 304 maintains a mapping of where BLOCK x is stored in the cache. Thus, the backup agent 304 can retrieve BLOCK x from the cache when requested. In particular, the backup agent 304 receives current data of a block from the snapshot driver 306 before a "write" to that block is performed. If the snapshot driver 306 has no block bitmap (or filesystem bitmap) 334 available to it, then the backup agent 304 can store the cached blocks in memory. However, when the snapshot driver 306 does have a filesystem bitmap 334, the backup agent 304 can write the blocks to the cache 330 on the disk 310. Thus, in FIG. 3B some of the blocks (e.g., B0, B1, B3, B7, B9) in cache 330 may be either in memory or on the disk 310.

When the snapshot driver 306 reads blocks from the cache 330 it requests them from the backup agent 304 and the backup agent 304 retrieves the appropriate blocks from the cache and returns the blocks to the snapshot driver 306. The backup agent 304 also includes filesystem analysis logic 336 as described above. As described earlier, this filesystem analysis logic 336 within the backup agent 304 includes functionality to determine the type of filesystem on which the snapshot backup is being performed. In particular, the filesystem analysis logic 336 determines the type of filesystem present and then, based on the discovered filesystem type, can retrieve a block bitmap (or filesystem bitmap 334). The backup agent 304 can then provide that filesystem bitmap 334 to the snapshot driver 306 so that the snapshot driver 306 can more intelligently determine which blocks require a CoW.

FIG. 3B depicts an example set of bit values 324 in the CoW bitmap 320 and block values in the blocks 328 of the disk 310. In particular, blocks 328 at the offsets {0, 1, 3, 7, 9} have been updated since the snapshot was initiated. So the original block data {B0, B1, B3, B7, B9} are in the cache 330. Blocks {C0, C1, C3, C7, C9} are updated blocks on the disk 310. Additionally, bits at the offsets {0, 1, 3, 7, 9} in the CoW bitmap 320 are set to "1". The snapshot device driver 306, using the snapshot block device 322, presents the snapshot as a normal disk. When an application requests a read of one of the blocks of the snapshot block device 322, the snapshot block device module 323 checks the CoW bitmap 320 to determine whether to request that block from the cache 330 or the disk 310.

When there is a "write request" to the disk, the snapshot driver 306: holds the write request, provides the data of the target block to the backup agent 304 who stores it in the cache 330, sets the corresponding bit in the CoW bitmap 320 to "1", and then passes the write request to the disk 310.

Figure 4:
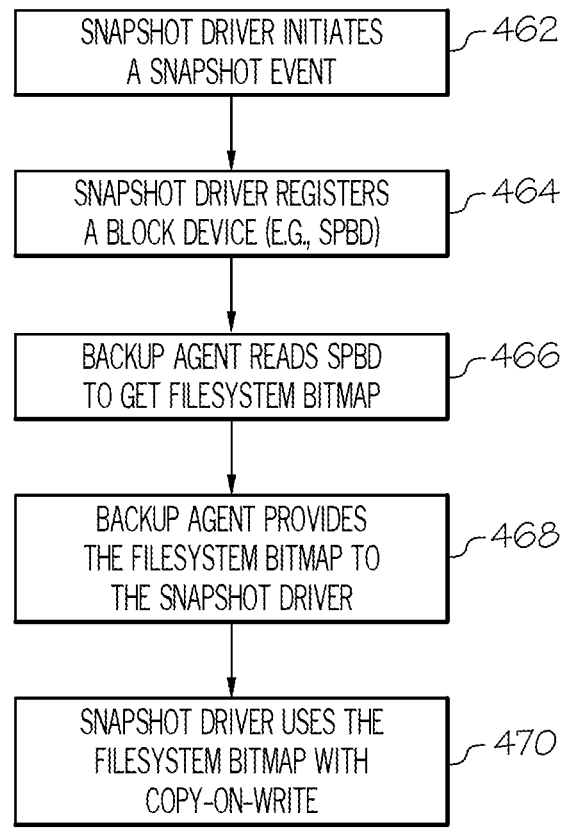
FIG. 4 depicts a flowchart of an exemplary process for performing a snapshot backup in accordance with the principles of the present disclosure.

FIG. 4 depicts a flowchart of an exemplary process for performing a snapshot backup in accordance with the principles of the present disclosure. In step 462, a user's interaction (or an automated process) triggers the snapshot driver to initiate a snapshot event. Initially, there may be no filesystem bitmap available to the snapshot driver. Thus, the snapshot driver performs a CoW for all write requests, the CoW step includes updating of the CoW bitmap. Also, the backup agent receives the original blocks and stores them in cache in memory.

Next in step 464, the snapshot driver registers a block device (e.g., spbd) for which user applications can be designed to utilize that device for accessing a snapshot being managed by the snapshot driver. As noted above, the user application references block numbers, or block offsets, of this block device rather than the same block numbers of the actual disk. The backup agent 466, then reads various blocks of the block device (e.g., spbd) to locate and retrieve a filesystem bitmap. Once retrieved, the filesystem bitmap can be provided, in step 468, to the snapshot driver from the backup agent. From then on, the snapshot driver can use the filesystem bitmap when performing CoW operations, in step 470. Now any blocks that are cached by the backup agent can be written to the disk rather than simply stored in memory. Additionally, those cached blocks that reside only in memory can eventually be transferred to the disk cache as well.

Figure 5:
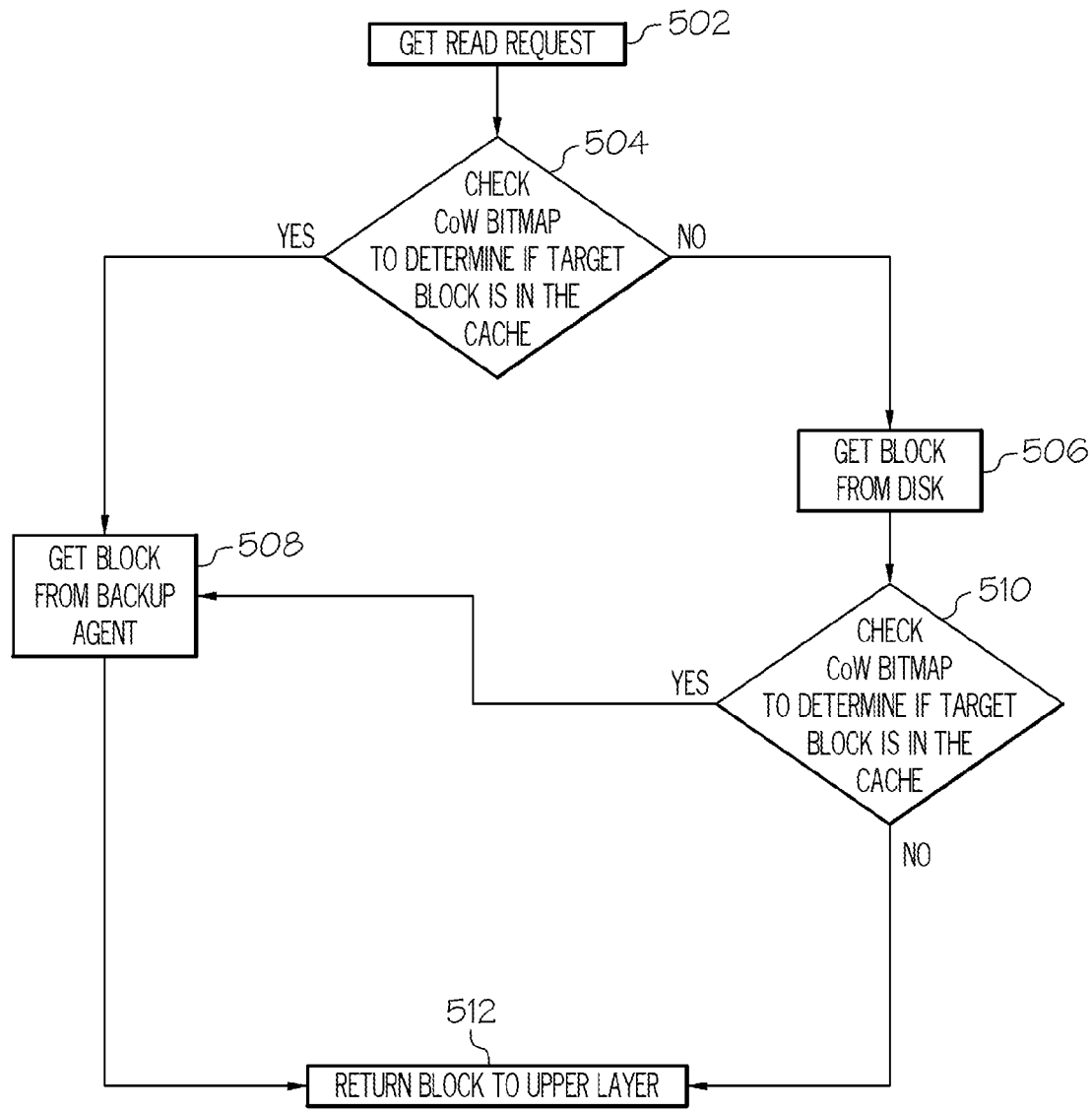
FIG. 5 depicts a flowchart of an exemplary process for retrieving a filesystem bitmap in accordance with the principles of the present disclosure.

The possibility arises that writing to the filesystem bitmap may occur while the backup agent is in the process of retrieving it and sending it to the snapshot driver. FIG. 5 depicts a flowchart of an exemplary process for retrieving a filesystem bitmap in accordance with the principles of the present disclosure.

In step 502, the snapshot block device module of the snapshot driver receives a read request from the backup agent for various blocks of the device (e.g., spbd) in order to retrieve the filesystem bitmap. In step 504, the snapshot block device module checks the CoW bitmap to see if those requested blocks are already in the cache (i.e., they have been updated since the snapshot was initiated). If so, then the snapshot block device module requests those blocks from the backup agent in step 508.

If the target blocks are not in the cache, then the snapshot block device module, in step 506, requests the blocks from the disk. Once this occurs, then a subsequent check is made, in step 510, to determine if while the disk blocks were being retrieved in step 506, the target blocks were also being updated. So, in step 510, a second check is made of the CoW bitmap to determine if the target blocks are in the cache. If not, then the blocks retrieved in step 506 are returned to the backup agent in step 512. If, however, the target blocks are now in the cache, then step 508 is performed to retrieve the target blocks from the cache so that they can be returned, in step 512, to the backup agent.

In accordance with the principles of the present disclosure, filesystem specific logic can be located in user space as opposed to kernel space. Thus, the snapshot driver can be simpler and more robust. When support for a new file system is desired, then only user space applications need to change; the snapshot driver does not.

Figure 6:
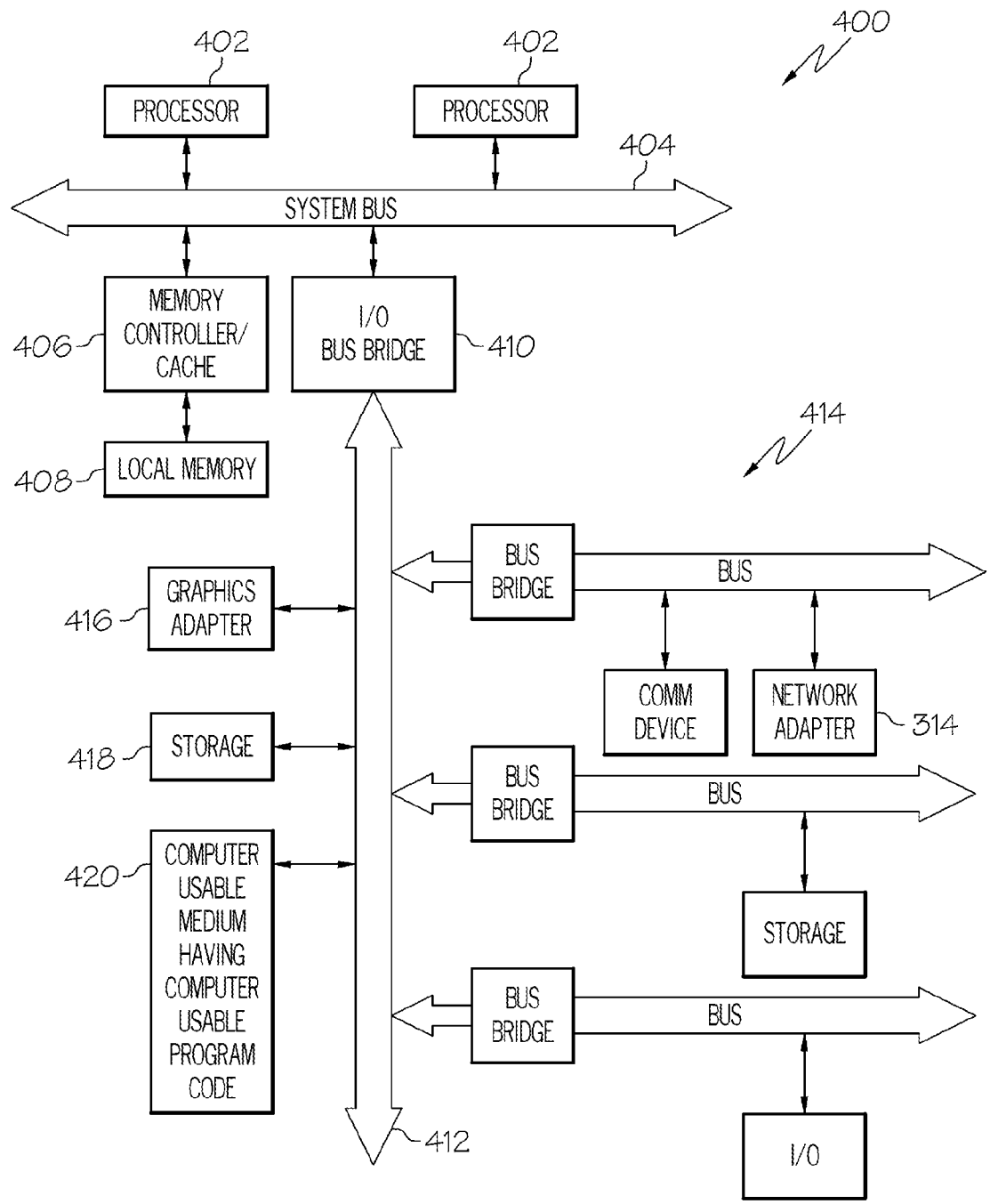
FIG. 6 illustrates a block diagram of a data processing system in accordance with the principles of the present disclosure.

Referring to FIG. 6, a block diagram of a data processing system is depicted in accordance with the present disclosure. A data processing system 400, such as may be utilized to implement the hardware platform 108 or aspects thereof, e.g., as set out in greater detail in FIG. 3A-FIG. 5, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 3A-FIG. 5.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
   initiating, by a snapshot driver executing on a computer, a snapshot of at least a portion of a filesystem;
   receiving, by the snapshot driver, a read request from a backup agent executing on the computer, the backup agent being different than the snapshot driver,
      wherein the read request comprises data identifying a block of data of the filesystem that includes a filesystem bitmap of the filesystem;
   in response to the read request, retrieving by the snapshot driver, executing on the computer, the block of data of the filesystem that includes the filesystem bitmap of the filesystem; and
   providing, by the snapshot driver, the block of data to the backup agent;
   receiving by the snapshot driver, executing on the computer, the filesystem bitmap of the filesystem from the backup agent, executing on the computer; and
   performing copy-on-write operations, by the snapshot driver executing on the computer, based on the filesystem bitmap of the filesystem.

2. The method of claim 1, comprising:
   maintaining, by the snapshot driver, a copy-on-write bitmap,
      wherein the copy-on-write bitmap comprises a plurality of bits with each of the plurality of bits corresponding to a respective block of the filesystem and each of the plurality of bits having a respective value representing whether its corresponding block has been updated since initiation of the snapshot.

3. The method of claim 1, comprising:
   creating, by the snapshot driver, a logical snapshot block device,
      wherein the backup agent accesses the snapshot using said logical snapshot block device.

4. The method of claim 1, comprising:
   maintaining, by the snapshot driver, a copy-on-write bitmap,
      wherein the copy-on-write bitmap comprises a plurality of bits with each of the plurality of bits corresponding to a respective block of the filesystem and each of the plurality of bits having a respective value representing whether its corresponding block has been updated since initiation of the snapshot; and
   creating, by the snapshot driver, a logical snapshot block device,
      wherein said logical snapshot block device provides the backup agent with access to the snapshot and each block of the logical snapshot block device corresponds to a respective block of the filesystem.

5. The method of claim 4, comprising:
receiving, by the snapshot driver, a request from the backup agent for a particular block of the logical snapshot block device; and
based on the copy-on-write bitmap, determining by the snapshot driver whether the particular block corresponds to a block of the filesystem that has been updated since initiation of the snapshot.

6. The method of claim 5, comprising:
when the particular block corresponds to a block of the filesystem that has been updated, then requesting, by the snapshot driver, the particular block from the backup agent; and
when the particular block corresponds to a block of the filesystem that has not been updated, then requesting, by the snapshot driver, the particular block from a disk on which the filesystem is stored.

7. The method of claim 6, comprising:
receiving, by the snapshot driver, the particular block.

8. The method of claim 7, comprising:
when the particular block is received by the snapshot driver from the disk, then determining, by the snapshot driver, based on the copy-on-write bitmap, whether the particular block corresponds to a block of the filesystem that has been updated since initiation of the snapshot; and
when the particular block corresponds to a block of the filesystem that has been updated, then requesting, by the snapshot driver, the particular block from the backup agent.

9. The method of claim 8, comprising:
returning, by the snapshot driver, the received particular block, to the backup agent.

10. A system comprising:
a processor and a memory coupled to the processor, the memory configured to store program code executable by the processor;
the program code, when executed by the processor, configured to initiate, by a snapshot driver, a snapshot of at least a portion of a filesystem;
the program code, when executed by the processor, is further configured to receive, by the snapshot driver, a read request from a backup agent, the backup agent being different than the snapshot driver;
wherein the read request comprises data identifying a block of data of the filesystem that includes a filesystem bitmap of the filesystem;
the program code, when executed by the processor, is further configured to, in response to the read request, retrieve by the snapshot driver the block of data of the filesystem that includes the filesystem bitmap of the filesystem;
the program code, when executed by the processor, is further configured to provide, by the snapshot driver, the block of data to the backup agent;
the program code, when executed by the processor, configured to receive by the snapshot driver the filesystem bitmap from the backup agent of the filesystem; and
the program code, when executed by the processor, configured to perform copy-on-write operations, by the snapshot driver, based on the filesystem bitmap of the filesystem.

11. The system of claim 10, wherein:
the program code, when executed by the processor, is further configured to maintain, by the snapshot driver, a copy-on-write bitmap,
wherein the copy-on-write bitmap comprises a plurality of bits with each of the plurality of bits corresponding to a respective block of the filesystem and each of the plurality of bits having a respective value representing whether its corresponding block has been updated since initiation of the snapshot.

12. The system of claim 10, wherein:
the program code, when executed by the processor, is further configured to create, by the snapshot driver, a logical snapshot block device,
wherein said logical snapshot block device provides the backup agent with access to the snapshot.

13. The system of claim 10, wherein:
the program code, when executed by the processor, is further configured to maintain, by the snapshot driver, a copy-on-write bitmap,
wherein the copy-on-write bitmap comprises a plurality of bits with each of the plurality of bits corresponding to a respective block of the filesystem and each of the plurality of bits having a respective value representing whether its corresponding block has been updated since initiation of the snapshot; and
the program code, when executed by the processor, is further configured to create, by the snapshot driver, a logical snapshot block device,
wherein said logical snapshot block device provides the backup agent with access to the snapshot and each block of the block device corresponds to a respective block of the filesystem.

14. The system of claim 13, wherein:
the program code, when executed by the processor, is further configured to receive, by the snapshot driver, a request from the backup agent for a particular block of the logical snapshot block device; and
the program code, when executed by the processor, is further configured to, based on the copy-on-write bitmap, determine by the snapshot driver whether the particular block corresponds to a block of the filesystem that has been updated since initiation of the snapshot.

15. The system of claim 14, wherein:
the program code, when executed by the processor, is further configured to, when the particular block corresponds to a block of the filesystem that has been updated, request, by the snapshot driver, the particular block from the backup agent; and
the program code, when executed by the processor, is further configured to, when the particular block corresponds to a block of the filesystem that has not been updated, request, by the snapshot driver, the particular block from a disk on which the filesystem is stored.

16. The system of claim 15, wherein:
the program code, when executed by the processor, is further configured to receive, by the snapshot driver, the particular block.

17. The system of claim 16, wherein:
the program code, when executed by the processor, is further configured to, when the particular block is received by the snapshot driver from the disk, determine, by the snapshot driver, based on the copy-on-write bitmap, whether the particular block corresponds to a block of the filesystem that has been updated since initiation of the snapshot; and the program code, when executed by the processor, is further configured to, when the particular block corresponds to a block of the filesystem that has been updated, request, by the snapshot driver, the particular block from the backup agent.

18. The system of claim 17, wherein:
the program code, when executed by the processor, is further configured to return, by the snapshot driver, the received particular block, to the backup agent.

19. A computer program product, comprising:
a computer readable non-transitory storage medium having computer readable program code embodied therewith, the computer readable program code comprising:
computer readable program code configured to initiate, by a snapshot driver, a snapshot of at least a portion of a filesystem;
computer readable program code configured to receive, by the snapshot driver, a read request from a backup agent, the backup agent being different than the snapshot driver;
  wherein the read request comprises data identifying a block of data of the filesystem that includes a filesystem bitmap of the filesystem;
computer readable program code configured to, in response to the read request, retrieve by the snapshot driver the block of data of the filesystem that includes the filesystem bitmap of the filesystem;
computer readable program code configured to provide, by the snapshot driver, the block of data to the backup agent;
computer readable program code configured to receive by the snapshot driver the filesystem bitmap from the backup agent of the filesystem; and
computer readable program code configured to perform copy-on-write operations, by the snapshot driver, based on the filesystem bitmap of the filesystem.

20. The computer program product of claim 19, comprising:
computer readable program code configured to maintain, by the snapshot driver, a copy-on-write bitmap,
  wherein the copy-on-write bitmap comprises a plurality of bits with each of the plurality of bits corresponding to a respective block of the filesystem and each of the plurality of bits having a respective value representing whether its corresponding block has been updated since initiation of the snapshot.

21. The computer program product of claim 19, comprising:
computer readable program code configured to create, by the snapshot driver, a logical snapshot block device, wherein said logical snapshot block device provides the backup agent with access to the snapshot.

22. The computer program product of claim 19, comprising:
computer readable program code configured to maintain, by the snapshot driver, a copy-on-write bitmap, wherein the copy-on-write bitmap comprises a plurality of bits with each of the plurality of bits corresponding to a respective block of the filesystem and each of the plurality of bits having a respective value representing whether its corresponding block has been updated since initiation of the snapshot; and
computer readable program code configured to create, by the snapshot driver, a logical snapshot block device, wherein said logical snapshot block device provides the backup agent with access to the snapshot and each block of the block device corresponds to a respective block of the filesystem.

23. The computer program product of claim 22, comprising:
computer readable program code configured to receive, by the snapshot driver, a request from the backup agent for a particular block of the logical snapshot block device; and
computer readable program code configured to, based on the copy-on-write bitmap, determine by the snapshot driver whether the particular block corresponds to a block of the filesystem that has been updated since initiation of the snapshot.

24. The computer program product of claim 23, comprising:
computer readable program code configured to, when the particular block corresponds to a block of the filesystem that has been updated, request, by the snapshot driver, the particular block from the backup agent; and
computer readable program code configured to, when the particular block corresponds to a block of the filesystem that has not been updated, request, by the snapshot driver, the particular block from a disk on which the filesystem is stored.

25. The computer program product of claim 24, comprising:
computer readable program code configured to receive, by the snapshot driver, the particular block.

26. The computer program product of claim 25, comprising:
computer readable program code configured to, when the particular block is received by the snapshot driver from the disk, determine, by the snapshot driver, based on the copy-on-write bitmap, whether the particular block corresponds to a block of the filesystem that has been updated since initiation of the snapshot; and
computer readable program code configured to, when the particular block corresponds to a block of the filesystem that has been updated, request, by the snapshot driver, the particular block from the backup agent.

27. The computer program product of claim 26, comprising:
computer readable program code configured to return, by the snapshot driver, the received particular block, to the backup agent.

* * * * *